United States Patent [19]

Kobelt

[11] 4,453,428
[45] Jun. 12, 1984

[54] SELF-ALIGNING SWIVEL ASSEMBLY FOR PUSH-PULL CABLE CONTROL LEVER ASSEMBLY

[76] Inventor: Jacob Kobelt, 6110 Oak St., Vancouver, British Columbia, Canada, V6M 2W2

[21] Appl. No.: 261,048

[22] Filed: May 6, 1981

[51] Int. Cl.³ .................. F16C 1/10; G05G 1/00; G05G 3/00
[52] U.S. Cl. ................... 74/501 R; 74/570
[58] Field of Search .................... 74/501 R, 570

[56] References Cited

U.S. PATENT DOCUMENTS

| | | | |
|---|---|---|---|
| 2,602,179 | 7/1952 | Biraben | 74/501 |
| 2,884,109 | 4/1959 | Morse | 74/501 |
| 2,968,194 | 1/1961 | Thompson et al. | 74/501 X |
| 2,975,653 | 3/1961 | Morse | 74/501 |
| 3,085,447 | 4/1963 | Shay | 74/501 |
| 4,019,402 | 4/1977 | Leonhart | 74/501 |

FOREIGN PATENT DOCUMENTS 2754727 7/1978 Fed. Rep. of Germany ........ 74/501

Primary Examiner—Lawrence J. Staab
Assistant Examiner—Anthony W. Raskob, Jr.
Attorney, Agent, or Firm—Carver & Co.

[57] ABSTRACT

A control lever assembly for actuating a control cable, particularly a cable of the type capable of transmitting compressive forces as well as tensile forces, known as a push-pull cable. The assembly has a lever journalled for rotation relative to a body thereof, and a core anchoring structure adapted to rotate with the lever and to be subjected to relative lateral movement during such rotation. The core anchoring means anchors one end of a core of the control cable, and a sheath retaining means retains a portion of a sheath of the cable to restrict axial movement of the sheath following actuation of the cable. A connecting structure, which is structurally independent of the control cable, cooperates with the sheath retaining structure and the core anchoring structure to swivel the sheath retaining structure in response to rotation of the core anchoring structure. Thus, the sheath retaining structure swivels to accommodate the lateral movement of the core anchoring structure to maintain approximate alignment of the sheath with the core so as to reduce a tendency of the core to buckle under compressive loads.

10 Claims, 5 Drawing Figures

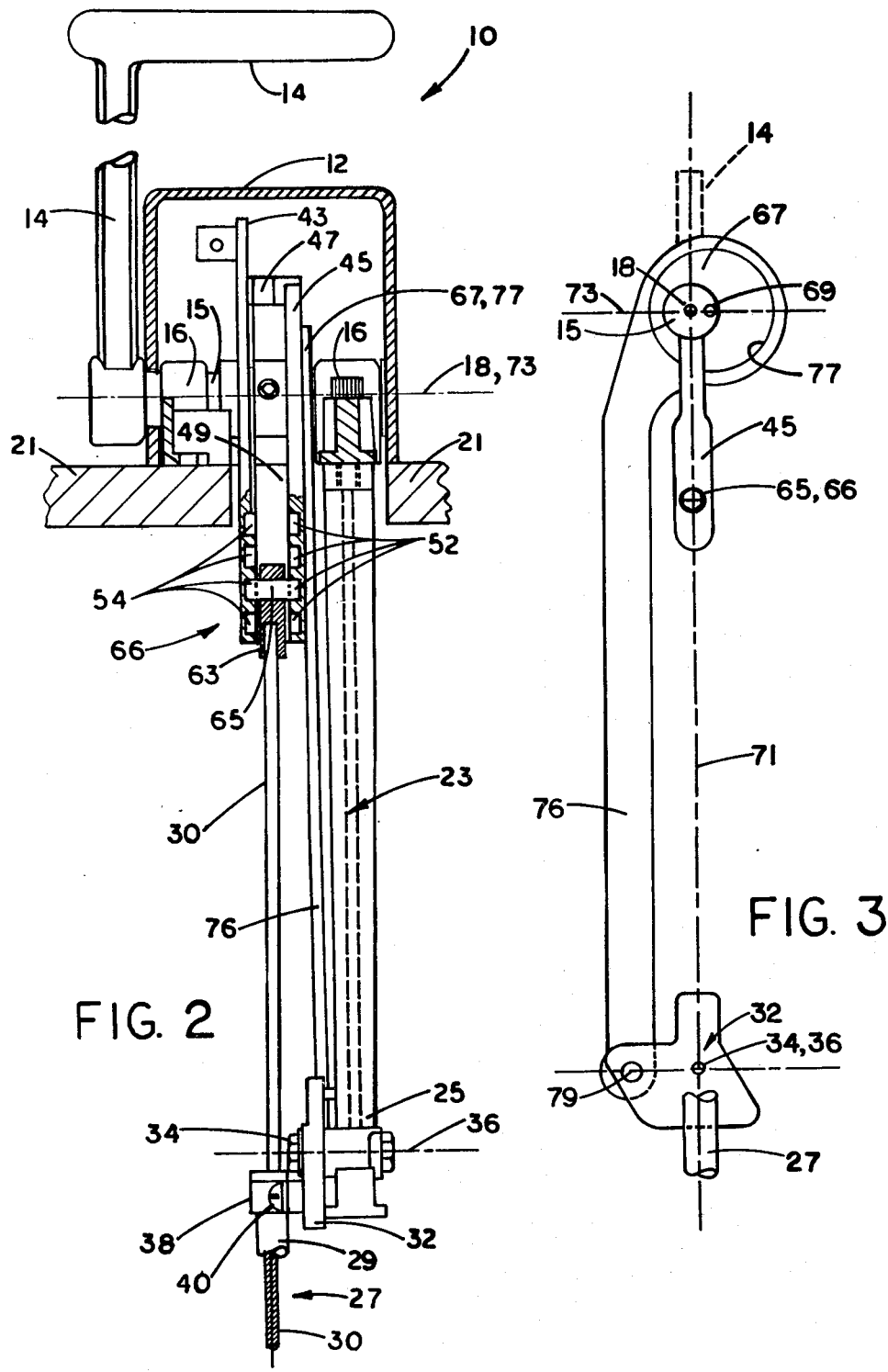

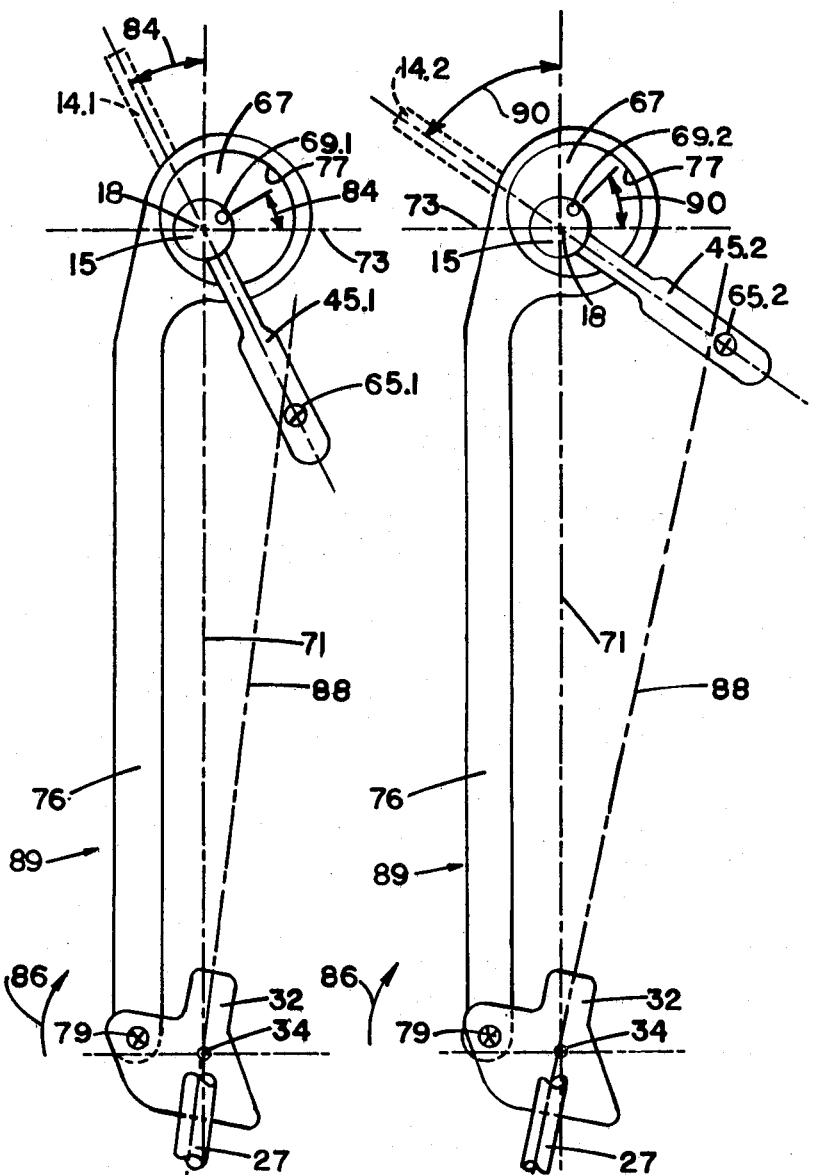

SELF-ALIGNING SWIVEL ASSEMBLY FOR PUSH-PULL CABLE CONTROL LEVER ASSEMBLY

BACKGROUND OF THE INVENTION

1. Field of the Invention

The invention relates to a control lever assembly for actuating a control cable, particularly a cable capable of transmitting compressive forces as well as tensile forces, commonly called a push-pull cable, which has applications in the marine control industry.

2. Prior Art

Control heads for controlling devices remotely have been used for many years in the marine industry, for example, for controlling an engine and gearbox of a marine vessel. Bowden cables have been used successfully in certain applications, the Bowden cable having a sheath and a cable core slidable within the sheath. The core is relatively flexible and thus is prone to buckling when subjected to compressive forces, and preferably this type of cable is used only in situations where it is subjected to a tensile force.

The limitations of the Bowden cable to transmitting force in one direction, namely as a tensile force, have been recognized for many years and now a cable having a stiffer core has been developed, such cable being known as a push-pull cable which is capable of carrying a degree of compressive forces before buckling when extending from an end of the sheath and being unsupported by the sheath. The tendency of a push-pull cable to buckle under compressive force is proportional to the length of unsupported core extending from the sheath, and also, to some extent, the alignment of the sheath with the core itself and the line of action and direction of the compressive force applied to the core. Commonly, a core of cable is anchored to a rotatable member at a position spaced from the axis of rotation thereof so that as the member is rotated the core anchoring means, and with it the core, is subjected to swinging and lateral movement which shifts the cable core from a position aligned with an adjacent end portion of the sheath. To reduce buckling and binding tendencies of the sheath on the core, the adjacent end of the sheath swivels to accomodate the lateral swinging of the core. This is attained by several diffent methods in the prior art, for example, see U.S. Pat. No. 2,975,653 (Morse) and U.S. Pat. No. 3,101,821 (Henry). In both of these prior art structures, an adjacent end portion of the sheath enclosing the core is swung laterally by direct movement of the core itself acting on the sheath, which swivels on a sheath swivelling connection. Whilst this arrangement is satisfactory for some applications, where there is a relatively long length of unsupported core extending from the outer portion of the sheath to the core connection and a compressive force is applied to the core, as in the pushing mode, buckling of the core can result due to the inability of the sheath to follow wide swings of the core and to become aligned therewith.

SUMMARY OF THE INVENTION

The difficulties and disadvantages of the prior art are reduced by providing a control lever assembly according to the invention in which the sheath of the control cable has an adjacent end portion which is swivellable positively by means other than the lateral force of the core acting on the sheath itself. As the anchored end of the core swings through an arc due to rotation of the lever, a positive connection between the lever and the sheath swivels the adjacent end portion of the sheath to accomodate the lateral movement to maintain approximate alignment of the sheath with the core without excessive lateral forces acting on the core, thus reducing a tendency of the unsupported core to buckle under compressive forces.

A control lever assembly according to the invention is for actuating a control cable having a cable sheath and a cable core slidable within the sheath, the assembly having a body, a manually actuated operator's lever and a core anchoring means. The lever is journalled for rotation relative to the body about a lever axis and the core anchoring means cooperates with the lever to rotate therewith relative to the body so that the core anchoring means is subjected to relative displacement during such rotation. The core anchoring means also is adapted to anchor one end of the core of the control cable. The assembly is further characterized by a sheath retainer member and a connecting member. The sheath member is journalled for rotation relative to the body about a retainer axis and cooperates with the sheath to retain a portion of the sheath to essentially prevent axial movement of the sheath along the core of the cable and relative to the body following actuation of the cable. The connecting means, which is structurally independent of the control cable, cooperates with the sheath retainer members to swivel the sheath retainer member about the retainer axis in response to rotation of the core anchoring means. This causes the sheath retainer member to swivel about the retainer axis to accomodate the relative displacement of the core anchoring means to maintain approximate alignment of the sheath with the core.

A detailed disclosure following, related to drawings, describes a preferred embodiment of the invention which is capable of expression in structure other than that described and illustrated.

DESCRIPTION OF THE DRAWINGS

FIG. 2 is a simplified fragmented end elevation of the assembly of FIG. 1, FIGS. 3, 4 and 5 are simplified sequence diagrams showing the control lever assembly in a central position, an intermediate position and an extreme outer position respectively, showing progressive swivelling of a sheath retaining means.

DETAILED DISCLOSURE

FIGS. 1 and 2

Figure 1:
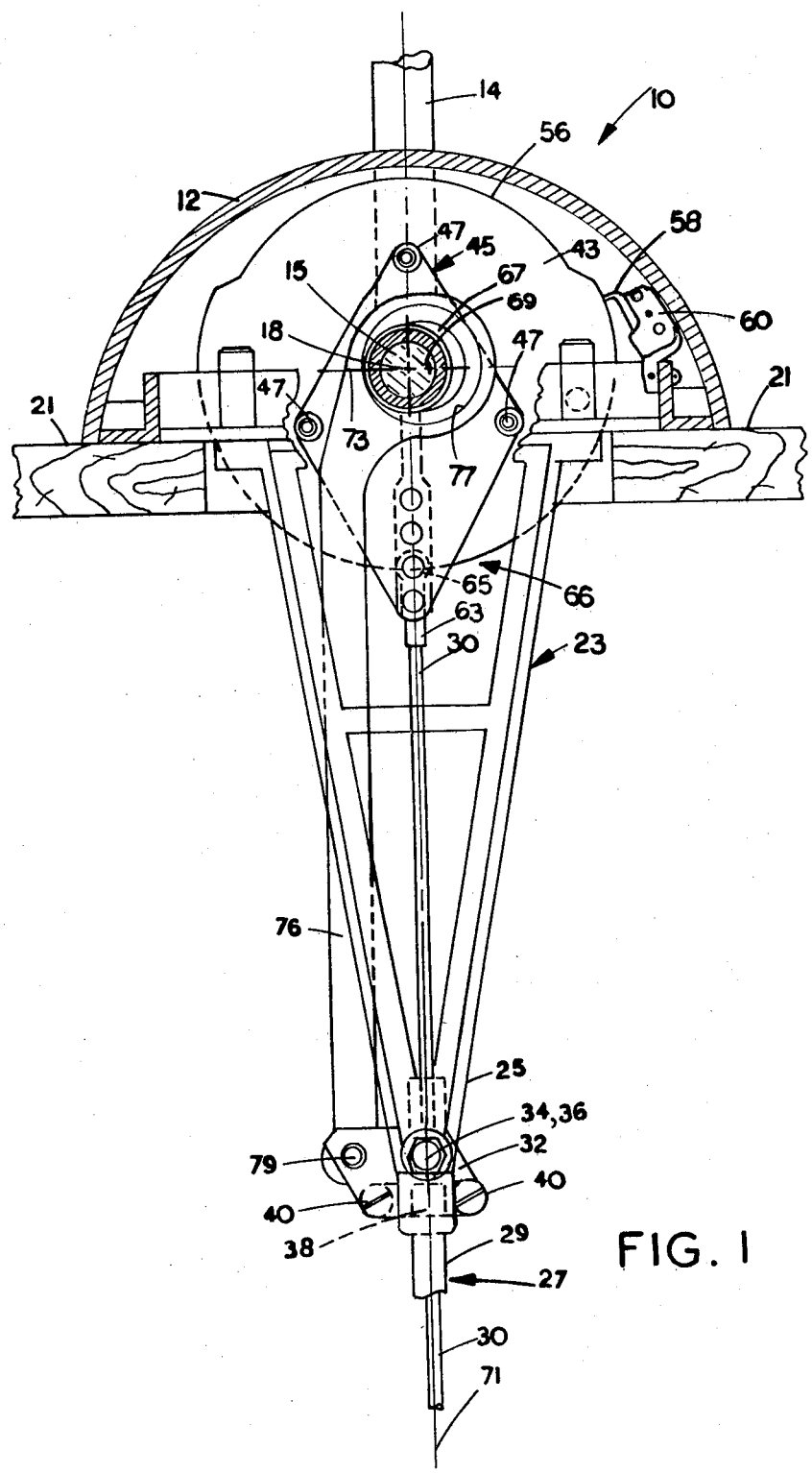
FIG. 1 is a simplified fragmented side elevation of a control lever assembly according to the invention, some portions being shown in section or in broken outline.

A control lever assembly 10 according to the invention has a body 12 and a manually actuated lever 14 for gripping by an operator extending from a lever spindle 15. The spindle is journalled relative to the body in a pair of spaced journals 16 for rotation relative to the body about a lever axis 18. The body is adapted to be secured to a table surface 21, and carries a cable support 23 extending below the table to a lower end 25.

A control cable 27 has a cable sheath 29 and a cable core 30 slidable within the sheath, the cable core being sufficiently stiff to permit transmission of compression forces relative to the sheath, and is commonly called a push-pull cable. A sheath retainer member 32 is journalled on a bolt 34 at the lower end 25 so that the retainer member is journalled for rotation relative to the body about a retainer axis 36 which is disposed parallel to the lever axis. The axis 36 is also disposed closely adjacent and normally to a portion of the core extending between the sheath retainer member and the core anchoring means. This is accomplished by means of a generally U-shaped sheath clamp 38 secured by bolts 40 to the retainer member 32 so as to essentially prevent longitudinal movement of the sheath 29 relative to the retainer member 32. Thus the retainer member 32 and the clamp 38 and associated structure serve as sheath retaining means cooperating with the sheath to retain a portion of the sheath to restrict or essentially prevent axial movement of the sheath along the core of the cable and relative to the body following actuation of the cable.

A rotatable member 43 is disc-like and is secured to the lever spindle 15, and thus cooperates with the lever to rotate therewith. A support member 45 is securable by three screws, severally 47, to the support member so as to rotate therewith and to provide a clearance 49 between the rotatable and support members. The support member 45 is a four-sided plate-like member which has a series of axially disposed recesses, severally 52, which face inwardly into the clearance 49 and are aligned with a similar series of axially disposed recesses 54 in the rotatable member 43. The rotatable member has an outer cam surface 56 with which a cam follower 58 cooperates to actuate a limit switch 60 so as to control electrical devices, not shown, as required. Clearly, other structures can cooperate with the rotatable member for particular functions. A cable fitting 63 is fitted at an outer end of the cable core 30 and has a cylindrical bore therein to receive a spindle 65. The spindle 65 has opposite ends carried in a pair of the aligned recesses 52 and 54, and fits in the clearance between the members 43 and 45. Thus, an intermediate portion of the spindle journals the cable fitting between the members and serves as a journalling means which is a cylindrical element cooperating with the cable fitting and journalled in the aligned recesses. Clearly, the cable fitting could have other means to cooperate with the members 43 and 45 in which only one of the members 43 or 45 requires a recess. The rotatable member 43, the support member 45, the spindle 65 and the cable fitting 63 serve as core anchoring means 66 cooperating with the lever to rotate therewith relative to the body so as to be subjected to relative displacement or lateral movement during such rotation. It can be seen that the core anchoring means is adapted to anchor one end of the core of the control cable and clearly, equivalent structures can be divised. A particular advantage of the core anchoring means as described herein is that the cable can be secured relative to the lever means by a simple structure which does not require cotter pins, bolts with locking nuts, etc. to retain the end of the cable. Also, the anchoring means is a relatively compact structure which, by providing the series of aligned recesses, permits easy adjustment of the moment arm or lever effect of the core anchoring means relative to the lever axis. As shown, the spindle 65 is fitted in the second pair of recesses of the series, and thus provides a relativey large cable core axial movement for a particular rotation of the lever, with a correspondingly large relative displacement or lateral movement of the chore anchoring means 66.

The structure as above described is adequate for applying tensile force to the core 30 of the cable because the sheath retainer member 32 could be made to be free to swivel to some extent about the retainer axis 36 in response to lateral movement or relative displacement of the outer end of the core or the core anchoring means which occurs when the lever rotates more than a few degrees. A full range of movement of the lever of between 50° and 60° on either side of an intermediate or central position as shown in FIGS. 1 and 2 would result in a corresponding swinging of the sheath up to about 15° either side of an aligned central position, as shown in FIGS. 3 through 5.

However, if the above structure were used to apply compressive forces to the core of the cable, it is likely that the adjacent end of the sheath would not be sufficiently aligned with the core or anchoring means to avoid excessive out of alignment forces on the core that would likely result in buckling of the core followed by permanent bending or breakage. The present invention is particularly adapted to essentially eliminate problems that result in the buckling of the core under compressive forces that occur in a pushing mode. This is accomplished by a simple structure which extends between the lever and sheath retaining means to positively aligned the adjacent end of the sheath with the unsupported portion of the core, as follows.

A circular cam 67 has a cam center 69 disposed laterally of a longitudinal plane 71 passing through the lever axis 18 and the retainer axis 36 when the lever is in an intermediate position thereof as shown. In effect, the cam center 69 is disposed in a transverse plane 73 which is disposed approximately at right angles to the longitudinal plane 71 when the lever is in the intermediate position. The cam means is disposed on a face of the support member 45, and is mounted eccentrically relative to the lever axis 18 for rotation with the core anchoring means so that rotation of the cam means results in a circular movement of the cam center. It can be seen that rotation of the cam means results in movement of the cam center out of the transverse plane 73, which movement has a component parallel to the longitudinal plane 71, as will be described. A connecting link 76 has an upper end having a circular recess 77 complementary to the circular cam 67 and a lower end connected by a hinge pin 79 to the sheath retainer member 32. The connecting link 76 thus serves as a cam follower having adjacent one end thereof a circular recess complementary to the circular cam to be accepted thereon and is connected to the sheath retainer member adjacent an opposite end thereof.

OPERATION

In FIGS. 1 through 3, the lever 14 is shown in a central or intermediate position midway between two extreme positions and the control cable 27 is aligned with the longitudinal plane 71 and the spindle 65 of the cable anchoring means. In FIG. 4, the lever 14 is swung through an angle 84, of about 30°, to a position shown at 14.1 in which the support means 45 and the spindle 65 have assumed corresponding displaced positions 45.1 and 65.1 disposed laterally of the longitudinal plane 71. The cam center 69 has swung through a similar angle 84 to a raised position 69.1 which results in a corresponding upward movement of the upper end of the connecting link 76 which results in a corresponding rotation of the sheath retainer member 32 in direction of an arrow 86. Rotation of the retainer member 32 causes a corresponding swinging of the adjacent end of the control cable 27, so that an axis 88 of the control cable which is aligned with a portion of the core 30 leaving the sheath, passes closely adjacent, or intercepts, the spindle 65. Because the spindle 65 is fitted in the second recess of the series of recesses, the axis 88 passes closely thereto, as it would pass through a position about midway between the series of four recesses. It can therefore be seen that the connecting link 76 serves as a portion of a connecting means 89 which is structurally independent of the control cable and cooperates with the sheath retaining means, i.e. the member 32, and the core anchoring means to swivel the sheath retaining means in response to rotation of the core anchoring means. Thus, the sheath retaining means swivels to accomodate the lateral movement or relative displacement of the core anchoring means 66 to maintain approximate alignment of the sheath with the core. It can be seen that, in this position, if the direction of rotation of the lever 14 is reversed so that a compressive force is applied to the core of the cable, the core maintains substantial alignment with the sheath as the support member 45 swings back towards the plane 71. It can be seen that the connecting means 89 also includes a drive means, namely the cam means, which is journalled for rotation with the core anchoring means, and also a driven means, namely the cam follower or connecting link 76, which cooperates with the driver means and the retainer member so that lateral movement or relative displacement of the core anchoring means is reflected approximately by a corresponding rotation of the retainer member about the retainer axis. In effect, the connecting link 76 or cam follower provides a rigid positive connection between the retainer member and the cam to reflect movement of the cam in either direction, and thus, eliminates some problems of the prior art where the necesasary lateral swivelling force is normally applied to the sheath itself to cause the swinging of the sheath. With some earlier structures, the lateral swivelling force would tend to aggravate the tendency of the core to buckle under compressive loads.

Referring to FIG. 5, the lever 14 is swung through an angle 90 to assume an extreme position 14.2, between 50° and 60° from the central position. This produces a corresponding rotation of the support means to an extreme position 45.2 in which the spindle 65 assumes an extreme position 65.2. The cam center 69 assumes an extreme raised position 69.2 after swinging through the angle 90 and this causes a corresponding additional upwards movement of the connecting link 76 to further rotate the sheath retainer member in direction of the arrow 86. This rotation produces an additional swivelling of the sheath 27 so that the axis 88 of the core 30 is maintained to be substantially aligned with the core anchoring means on the spindle 65.

It is assumed that the central position of the lever, as shown in FIG. 3, is in fact an intermediate position of the lever disposed equally between two outer extreme positions. The description above discusses swinging of the lever, with a corresponding rotation of the sheath anchoring means to one extreme position, and by inspection, it can be seen that rotation of the lever in the opposite direction to an angle equal to the angle 90 would result in a corresponding swinging of the retainer member 32 in an opposite direction, so as to maintain alignment of the core with the core anchoring means for essentially all positions of the lever.

I claim:

1. A control lever assembly for actuating a control cable having a cable sheath and a cable core slidable within the sheath, the assembly having a body, a manualy actuated operator's lever which is journalled for rotation relative to the body about a lever axis, and a core anchoring means cooperating with the lever to rotate therewith relative to the body so that the core anchoring means is subjected to relative displacement during such rotation, the core anchoring means also being adapted to anchor one end of the core of the control cable, the assembly being further characterized by:
    (a) a sheath retainer member journalled for rotation relative to the body about a retainer axis, the retainer member cooperating with the sheath to retain a portion of the sheath to essentially prevent axial movement of the sheath along the core of the cable and relative to the body following actuation of cable,
    (b) connecting means, structurally independent of the control cable, cooperating with the sheath retainer member and the core anchoring means to swivel the sheath retainer member about the retainer axis in response to rotation of the core anchoring means,
    so that the sheath retainer member swivels about the retainer axis to accomodate the relative displacement of the core anchoring means to maintain approximate alignment of the sheath with the core.

2. A control lever assembly as claimed in claim 1 in which the retainer axis is disposed parallel to the lever axis and closely adjacent and normally to a portion of the core extending between the sheath retainer member and the core anchoring means.

3. A control lever assembly as claimed in claim 2 in which the connecting means includes:
    (a) driver means journalled for rotation with the core anchoring means,
    (b) driven means cooperating with the driver means and the retainer member,
    so that the relative displacement of the core anchoring means is reflected approximately by a corresponding rotation of the retainer member about the retainer axis.

4. A control lever assembly as claimed in claim 3 in which:
    (a) the driver means is a cam means,
    (b) the driven means is a cam follower.

5. A control lever assembly as claimed in claim 3 in which:
    (a) the driver means is a circular cam mounted eccentrically relative to the lever axis for rotation with the core anchoring means,
    (b) the driven means is a cam follower having adjacent one end thereof a circular recess complementary to the circular cam to be accepted thereon, and being connected to the sheath retaining member adjacent an opposite end thereof,
    so that the cam follower provides a rigid connection between the retainer member and cam to reflect movement of the cam in either direction.

6. A control lever assembly as claimed in claim 5 in which:
    (a) the body has a longitudinal plane passing through the lever axis and the retainer axis,
    (b) the cam means has a cam center disposed laterally of the longitudinal plane when the lever is in an intermediate position thereof, so that rotation of the cam means results in movement of the cam center, which movement has a component parallel to the longitudinal plane.

7. A control lever assembly as claimed in claim 6 which:
   (a) the intermediate position of the lever is disposed equally between two outer positions,
   (b) the cam center is disposed in a transverse plane which is disposed approximately at right angles to the longitudinal plane when the lever is in the intermediate position, so that rotation of the cam means results in movement of the cam center out of the transverse plane.

8. A control lever assembly as claimed in claim 1 in which the core anchoring means includes:
   (a) a rotatable member cooperating with the lever to rotate therewith,
   (b) a support member securable to the rotatable member so as to rotate therewith and to provide clearance between the rotatable member and support member,
   (c) a cable fitting fitted in the said clearance between the members and adapted for securing to the core of the cable,
   (d) journalling means cooperating with the cable fitting and with the members to journal the cable fitting between the members.

9. A control lever assembly as claimed in claim 8 in which:
   (a) the rotatable member and the support member both have recesses, the recesses being aligned with each other,
   (b) the journalling means being a cylindrical element cooperating with the cable fitting and journalled in the aligned recesses.

10. A control lever assembly as claimed in claim 9 in which:
   (a) the cable fitting has a cylindrical bore therein,
   (b) the journalling means is a spindle having opposite ends carried in the recesses of the rotatable member and the support member, and an intermediate portion journalling the cable fitting.

* * * * *